(12) United States Patent
Park et al.

(10) Patent No.: US 11,492,775 B2
(45) Date of Patent: Nov. 8, 2022

(54) MANHOLE COVER AND MANHOLE MANAGEMENT SYSTEM USING THE SAME

(71) Applicant: AMOSENSE CO., LTD, Cheonan-si (KR)

(72) Inventors: Jin Pyo Park, Seoul (KR); Won San Na, Seoul (KR)

(73) Assignee: Amosense Co., Ltd, Cheonan-si (KR)

( * ) Notice: Subject to any disclaimer, the term of this patent is extended or adjusted under 35 U.S.C. 154(b) by 433 days.

(21) Appl. No.: 16/631,853

(22) PCT Filed: Jul. 13, 2018

(86) PCT No.: PCT/KR2018/007942
§ 371 (c)(1),
(2) Date: Jan. 17, 2020

(87) PCT Pub. No.: WO2019/017653
PCT Pub. Date: Jan. 24, 2019

(65) Prior Publication Data
US 2020/0157761 A1 May 21, 2020

(30) Foreign Application Priority Data

Jul. 20, 2017 (KR) .................. 10-2017-0092103
Jul. 12, 2018 (KR) .................. 10-2018-0081170

(51) Int. Cl.
*H02J 50/12* (2016.01)
*E02D 29/14* (2006.01)
(Continued)

(52) U.S. Cl.
CPC ............ *E02D 29/14* (2013.01); *H01M 10/46* (2013.01); *H01Q 1/24* (2013.01); *H02J 50/12* (2016.02);
(Continued)

(58) Field of Classification Search
CPC .... E02D 29/14; E02D 2600/10; H01M 10/46; H01M 10/425; H01Q 1/24; H02J 50/12;
(Continued)

(56) References Cited

U.S. PATENT DOCUMENTS 7,598,858 B2 * 10/2009 Quist ................ G08B 25/08
340/539.22
2007/0145830 A1 * 6/2007 Lee .................... H02J 7/025
307/135

(Continued)

FOREIGN PATENT DOCUMENTS

JP      2015012504 A      1/2015
KR      100630639 B1 *    7/2005
(Continued)

*Primary Examiner* — Pinping Sun
(74) *Attorney, Agent, or Firm* — Rothwell, Figg, Ernst & Manbeck, P.C.

(57) ABSTRACT

A manhole cover and a manhole management system are provided. A manhole cover according to one embodiment includes: a cover body; an electronic unit including at least one sensing unit configured to sense information inside a manhole and at least one communication module configured to transmit information which is obtained through the sensing unit to the outside, and embedded in the cover body; a battery providing driving power to the electronic unit; and a (Continued)

wireless power reception antenna embedded in the cover body to receive wireless power supplied from the outside and provide the wireless power to the battery.

9 Claims, 5 Drawing Sheets

(51) Int. Cl.
*H01Q 1/24* (2006.01)
*H01M 10/46* (2006.01)
*H04B 5/00* (2006.01)
*H02J 50/80* (2016.01)

(52) U.S. Cl.
CPC ............ *H02J 50/80* (2016.02); *H04B 5/0031* (2013.01); *H04B 5/0037* (2013.01); *H04B 5/0081* (2013.01); *E02D 2600/10* (2013.01); *E05Y 2900/612* (2013.01)

(58) Field of Classification Search
CPC .......... H02J 50/80; H02J 7/0044; H02J 50/10; H02J 50/70; H04B 5/0031; H04B 5/0037; H04B 5/0081; E05Y 2900/612; Y02E 60/10

See application file for complete search history.

(56) References Cited

U.S. PATENT DOCUMENTS

| | | | | |
|---|---|---|---|---|
| 2009/0201123 | A1* | 8/2009 | Kafry ................... | G05B 15/02 340/3.1 |
| 2009/0261778 | A1* | 10/2009 | Kook ................... | H04B 5/0037 320/108 |
| 2009/0303039 | A1* | 12/2009 | Drake ................. | G08B 13/149 340/539.26 |
| 2011/0025133 | A1* | 2/2011 | Sauerlaender .......... | H02J 50/70 307/104 |
| 2012/0326661 | A1* | 12/2012 | Kada ................... | H02J 7/00045 320/108 |
| 2014/0306646 | A1* | 10/2014 | Liu ....................... | H02J 50/402 320/108 |
| 2017/0359094 | A1* | 12/2017 | Koo ...................... | E02D 29/14 |

FOREIGN PATENT DOCUMENTS

| | | | |
|---|---|---|---|
| KR | 20100042179 A | * | 4/2010 |
| KR | 20100042179 A | | 4/2010 |
| KR | 20100086182 A | | 7/2010 |
| KR | 20130057696 A | * | 11/2011 |
| KR | 20140091362 A | * | 7/2014 |
| KR | 20140091362 A | | 7/2014 |
| KR | 20150047050 A | * | 5/2015 |
| KR | 20150047050 A | | 5/2015 |

* cited by examiner

MANHOLE COVER AND MANHOLE MANAGEMENT SYSTEM USING THE SAME

CROSS REFERENCE TO RELATED APPLICATION

This application is the national phase entry of International Application No. PCT/KR2018/007942, filed on Jul. 13, 2018, which is based upon and claims priority to Korean Patent Applications 10-2017-0092103, filed on Jul. 20, 2017, and Korean Patent Applications 10-2018-0081170, filed on Jul. 12, 2018, the entire contents of which are incorporated herein by reference.

TECHNICAL FIELD

The present invention relates to a manhole cover and a manhole management system using the same.

BACKGROUND

Generally, when a gas pipe, a water and sewage pipe, a communication cable, a high-voltage cable, and the like are exposed to the ground or air, since a risk of occurrence of damage or various accidents due to environmental conditions such as rain or strong winds and contact with other objects increases, the gas pipe, the water and sewage pipe, the communication cable, the high-voltage cable, and the like are buried underground.

In this case, the risk of damage or the accidents due to the environmental conditions or the contact with other objects can be reduced, but since a worker can enter and exit through a manhole after burying the gas pipe, the water and sewage pipe, the communication cable, the high-voltage cable, and the like underground, accessibility of the worker for management and control is very low.

Accordingly, a measuring device which measures a corrosion state of the pipe and the amount of gas, water/sewage, electricity, and the like supplied through the pipe is installed in a pipe or the like.

In this case, the measuring device installed in the pipe or the like includes a measuring sensor and an antenna which transmits data measured from the measuring sensor to a wireless terminal on the ground or a communication base station of a control center.

That is, the antenna can transmit data measured by the measuring sensor to the wireless terminal or the like on the ground in a wireless manner or receive a wireless signal from the wireless terminal by transmitting or receiving the wireless signal with the wireless terminal or the like.

The above-described antenna is driven by power supplied from a power supply such as a battery. Accordingly, in order to continuously operate the antenna, it is necessary to periodically recharge or replace the battery.

However, a manhole cover which covers an open upper portion of the manhole is generally formed of a metallic material, and thus has a heavy weight and is difficult to handle. Further, when the manhole is formed adjacent to or in a roadway instead of in a sidewalk, traffic should be controlled while work is performed for safety of the workers.

Accordingly, work of replacing the battery is very simple work, but the work is inconvenient.

SUMMARY OF THE INVENTION

The present invention is directed to providing a manhole cover capable of conveniently charging a battery configured to drive an electronic unit such as an antenna without replacing the battery and a manhole management system using the same.

One aspect of the present invention provides a manhole cover including: a cover body; an electronic unit including at least one sensing unit configured to sense information inside a manhole and at least one communication module configured to transmit information which is obtained through the sensing unit to the outside, and embedded in the cover body; a battery providing driving power to the electronic unit;

and a wireless power reception antenna embedded in the cover body to receive wireless power supplied from the outside and provide the wireless power to the battery.

Further, the wireless power reception antenna may be embedded in a portion, which is formed of a nonconductive material, of the cover body.

In addition, the electronic unit may include one or more among a Global Positioning System (GPS) module, a near-field communication (NFC) module, a Bluetooth module, a temperature sensor, a humidity sensor, and a biometric sensor.

In addition, the information obtained through the sensing unit may be transmitted to an external server or a portable terminal through the communication module.

Meanwhile, another aspect of the present invention provides a manhole management system including the above-described manhole cover and a portable wireless charging device configured to transmit the wireless power to the wireless power reception antenna to provide power for charging the battery.

As an example, the portable wireless charging device may be a wireless charging pad including a housing and a wireless power transmission antenna embedded in the housing.

As another example, the portable wireless charging device may include a plug for electrical connection with an external power line.

Further, the portable wireless charging device may include a main body part connected to the housing through a cable, and the main body part may include a circuit part configured to drive the wireless power transmission antenna and a display part configured to check a charge level of the battery embedded in the manhole cover.

According to the present invention, since a battery which drives an electronic unit can be conveniently recharged in a wireless manner, replacing work of the battery is unnecessary, and thus maintenance is facilitated and work convenience can be improved.

DETAILED DESCRIPTION

Figure 1:
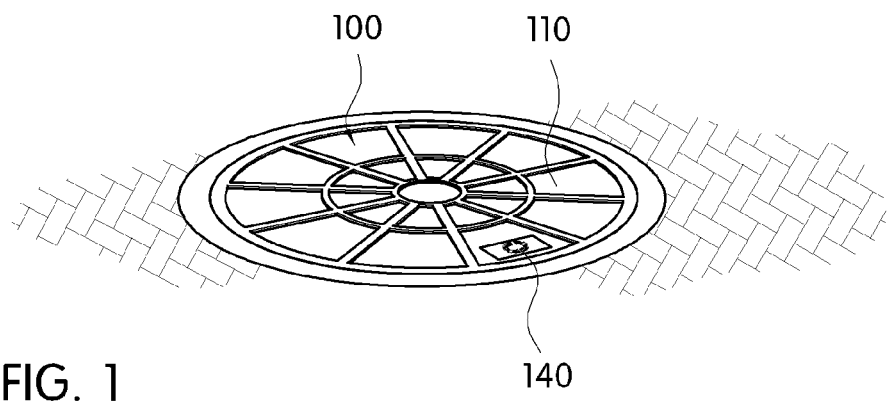
FIG. 1 is a view illustrating a manhole cover according to one embodiment of the present invention.
Figure 2:
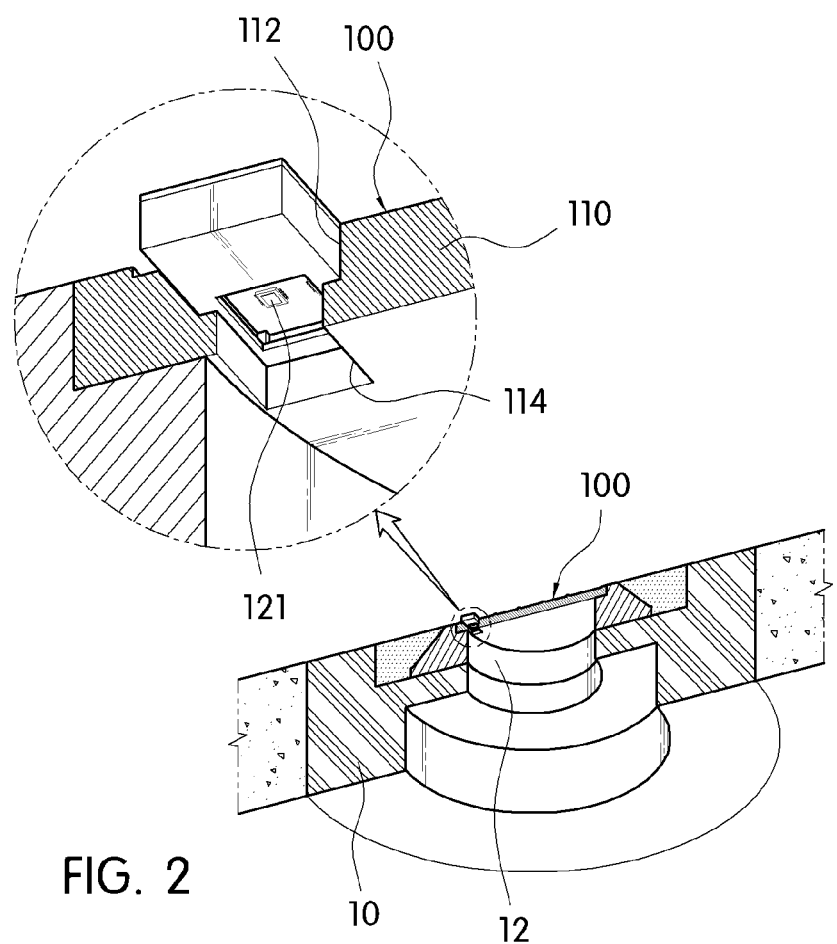
FIG. 2 is a partial enlarged cutaway view in which a cover body is partially enlarged in a state in which the manhole cover in FIG. 1 is installed on a manhole.
Figure 3:
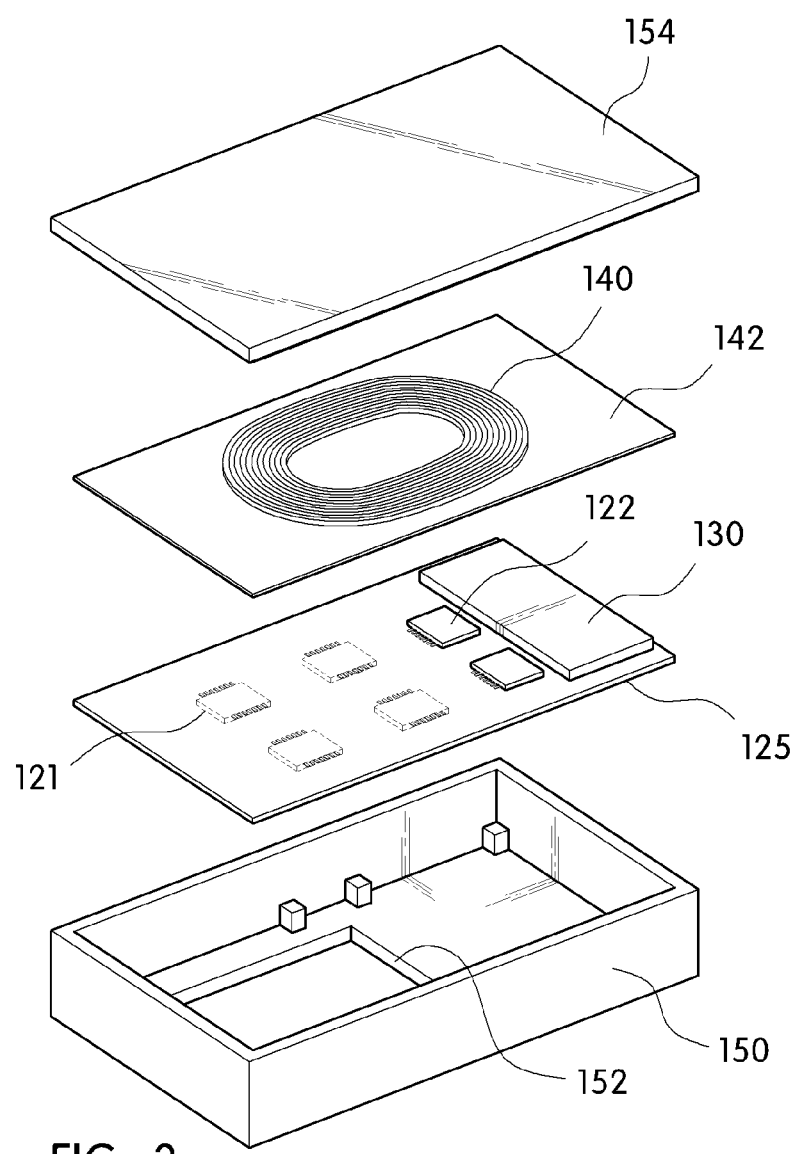
FIG. 3 is an exploded view illustrating an arrangement relationship between an electronic unit, a battery, and a wireless power reception antenna embedded in the cover body in the manhole cover according to one embodiment of the present invention.
Figure 4:
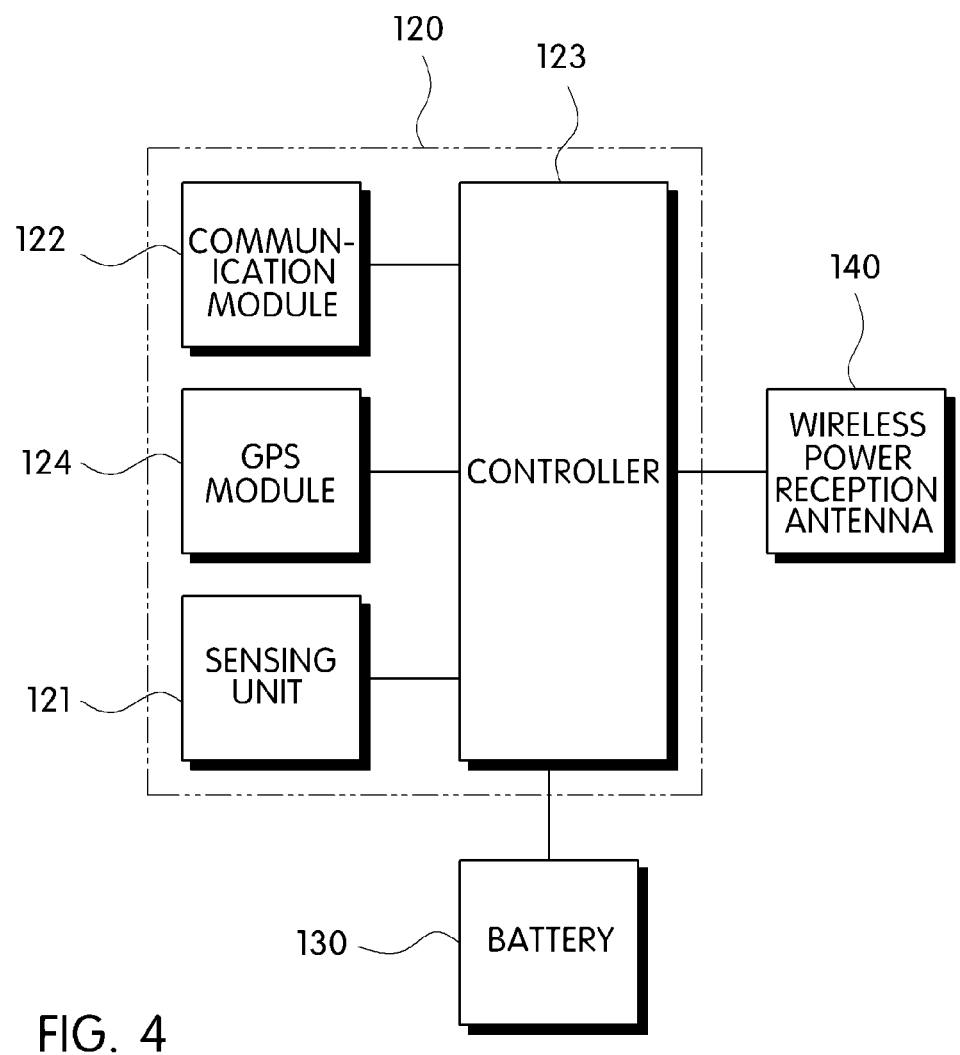
FIG. 4 is a block diagram illustrating main configurations applied to the manhole cover according to one embodiment of the present invention.

Hereinafter, exemplary embodiments of the present invention will be described in detail with reference to the accompanying drawings which may allow one of ordinary skill in the art to easily carry out the present invention. The present invention may be implemented in various forms and is not limited to the following embodiments. Components not related to the description are not included in the drawings to clearly describe the present invention, and the same reference symbols are used for the same or similar components in the description.

Figure 5:
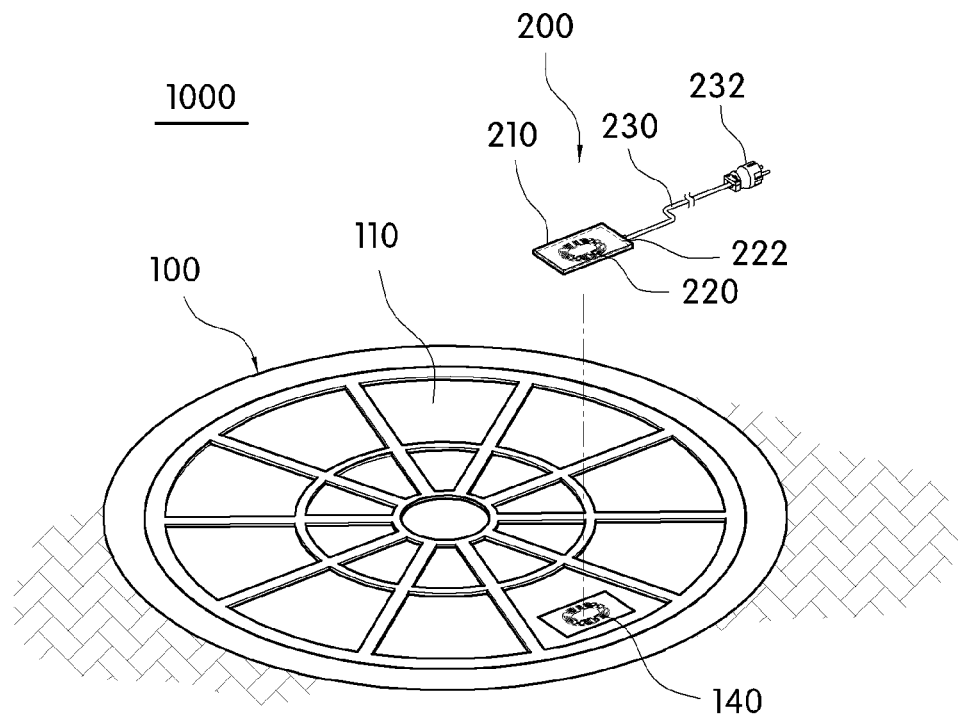
FIG. 5 is a schematic view illustrating a manhole management system according to one embodiment of the present invention.

As shown in FIG. 5, a manhole management system 1000 according to one embodiment of the present invention includes a manhole cover 100 and a wireless charging device 200 or 300.

The manhole cover 100 may prevent a human or an object from falling into a manhole 10 by covering an open upper portion of the manhole 10 formed in a road or road surface.

Here, the manhole 10 is a large structure buried in a sewer or basement and may have an entrance 12 formed therein so that a worker may easily enter the inside for cleaning or inspection. The above-described manhole 10 may be a sewage manhole, a water supply manhole, a communication manhole, a septic tank manhole, or the like, and the entrance 12 may be connected to a road surface such as a sidewalk or roadway.

In this case, as shown in FIGS. 1 to 4, the manhole cover 100 according to one embodiment of the present invention may include a cover body 110, an electronic unit 120, a battery 130, and a wireless power reception antenna 140.

Accordingly, the manhole cover 100 according to one embodiment of the present invention may sense information inside the manhole 10 and then transmit the sensed information to the outside in addition to performing a basic function of preventing a person or an object from falling into the manhole 10. Accordingly, a worker may easily monitor a state inside the manhole 10 at a distance far from the manhole 10 as well as at a short distance from the manhole 10. Detailed descriptions thereof will be described later.

The cover body 110 may have a predetermined area and cover the entrance 12 of the manhole 10. A known material such as metal, plastic, concrete, or the like generally used for a manhole cover may be entirely applied to the above-described cover body 110. Further, all of known and various shapes such as a circular shape, a quadrangular shape, and the like generally used as a shape of a manhole cover may be applied to the cover body 110.

In this case, in the cover body 110, an electronic unit 120 which senses the information inside the manhole 10 and then transmits the sensed information to the outside and a battery 130 which supplies power to the electronic unit 120 may be embedded.

In the present invention, the electronic unit 120 may include at least one sensing unit 121 which senses the information inside the manhole, a controller 123 which processes the information obtained through the sensing unit 121, and a communication module 122 which transmits the information processed through the controller 123 to the outside.

Further, the information inside the manhole sensed through the sensing unit 121 may be status information of a facility such as a pipe buried underground in the manhole or the like, may be environmental information such as a temperature, humidity, and the like inside the manhole, and may be biometric information of a worker working inside the manhole.

As an example, the sensing unit 121 may be a temperature sensor, a humidity sensor, a biometric sensor, an infrared sensor, a thermal sensor, or the like, and may be provided with one or a plurality among the above-described sensors. The above-described sensing unit 121 may be mounted on a circuit board 125 and externally exposed through a through hole 114 formed in a lower surface of the cover body 110.

However, the sensing unit 121 is not limited to the above, and another appropriate sensor may be applied according to information inside a manhole to be sensed. Accordingly, the sensing unit 121 may obtain various pieces of information inside the manhole to be measured.

Further, the communication module 122 may be a short range communication module which performs wireless communication according to a communication manner such as near field communication (NFC) communication, Bluetooth communication, radio frequency identification (RFID) communication, infrared data association (IrDA) communication, ultra wideband (UWB) communication, ZigBee communication, Long Range (LoRa) communication, RADAR communication, low power wireless communication, Wi-Fi communication, or the like, and a long range communication module which performs wireless communication according to a communication manner such as Global System for Mobile Communications (GSM), General Packet Radio Services (GPRS), Enhanced Data Rates for GSM Evolution (EDGE), Long Term Evolution-Advanced (LTE-A), LTE, Code Division Multiple Access (CDMA), Wideband CDMA (WCDMA), Evolution-Data Optimized (EVDO), wireless broadband (WiBro), Mobile Worldwide Interoperability for Microwave Access (WiMAX), or the like.

The above-described communication module 122 may have a shape in which a chipset suitable for an applied communication manner is mounted on the circuit board 125 and may serve as a repeater which transmits data transmitted from a terminal carried by the worker working inside the manhole 10 to a server or portable terminal.

Further, the controller 123 may calculate data on the basis of information sensed in the sensing unit 121 and transmit the calculated data to the server or portable terminal through the communication module 122.

In addition, the electronic unit 120 may include a memory part which stores the data calculated through the controller 123 and may further include a Global Positioning System (GPS) module 124 so that the worker may check and manage a location of the manhole 10 in real time from a remote location.

The above-described electronic unit 120 may be electrically connected to the battery 130 embedded in the cover body 110. Accordingly, the electronic unit 120 may be driven by receiving driving power from the battery 130.

Here, the battery 130 may be a secondary battery which may be charged and discharged and may be embedded in the cover body 110 together with the electronic unit 120. Further, the battery 130 may have a flexible shape or a prismatic shape.

In this case, in the manhole cover 100 according to one embodiment of the present invention, the battery 130 providing the driving power to the electronic unit 120 may be recharged through a wireless charging method. Accordingly, even when the manhole cover 100 is disposed on a roadway, the battery 130 may be recharged through the wireless charging method. Accordingly, since the manhole cover 100 according to one embodiment of the present invention does not require work of replacing the battery 130, maintenance work may be facilitated.

To this end, in the cover body 110, the wireless power reception antenna 140 which receives wireless power supplied from the outside to generate power provided to the battery 130 may be embedded.

Here, the wireless power reception antenna 140 may be directly electrically connected to the circuit board 125 on which the electronic unit 120 is mounted or may be connected to the circuit board 125 on which the electronic unit 120 is mounted through a separate circuit board. Further, an overall operation of the wireless power reception antenna 140 may be controlled by the controller 123.

In addition, the controller 123 may include a general charging circuit and a protection circuit related to wireless charging to smoothly charge the battery 130 using the wireless power received through the wireless power reception antenna 140.

Here, the wireless power reception antenna 140 may be a flat coil on which a conductive member is wound many times or may be an antenna pattern formed as a pattern in a loop shape on one surface of the circuit board.

Further, the wireless power reception antenna 140 may receive the wireless power through interaction with a wireless power transmission antenna 220 embedded in the wireless charging device 200 or 300. In addition, a known shielding sheet 142 formed of a magnetic material may be disposed on one surface of the wireless power reception antenna 140 so that the wireless charging may be smoothly performed.

In this case, the wireless charging device 200 or 300 may generate a magnetic field through the wireless power transmission antenna 220 and transmit power with the magnetic field in a wireless method using power supplied from a built-in battery or an external power supply.

Accordingly, the wireless power reception antenna 140 may generate power for recharging the battery 130 by receiving power transmitted from the wireless power transmission antenna 220 of the wireless charging device 200 or 300 to generate an induced electromotive force.

Accordingly, in the case in which the battery 130 embedded in the cover body 110 has to be recharged, when the wireless charging device 200 or 300 is disposed on an upper surface of the cover body 110, more specifically, an upper surface of the cover body 110 corresponding to a directly upper portion of the wireless power reception antenna 140, the battery 130 may be recharged by a wireless method using the wireless power reception antenna 140 and the wireless power transmission antenna 220 corresponding to each other.

Meanwhile, the electronic unit 120, the battery 130, and the wireless power reception antenna 140 which are described above may be directly embedded in the cover body 110 and may be embedded in a portion, which is formed of a nonconductive material, of the cover body 110.

Accordingly, in the manhole cover 100 according to one embodiment of the present invention, since occurrence of interference or noise due to a conductive material such as metal may be prevented, wireless charging and transmission and reception of a wireless signal may be smoothly performed during a process of transmitting or receiving the wireless power and a wireless data signal.

As a specific example, in the manhole cover 100, an accommodation part 112 having a predetermined area may be formed through the cover body 110, and a box-shaped case 150 formed of a nonconductive material may be inserted into and disposed in the accommodation part 112. In this case, the case 150 may be covered by a cover 154 detachably coupled to an open upper portion thereof.

Further, the wireless power reception antenna 140, the battery 130, and the circuit board 125 on which the electronic unit 120 is mounted, may be sequentially disposed in the case 150 along a height direction of the case 150.

In this case, the wireless power reception antenna 140 and the battery 130 may be electrically connected to the circuit board 125.

Further, the case 150 may have an opening 152 formed therethrough in an area corresponding to the through hole 114 at a lower side thereof. Accordingly, the sensing unit 121 mounted on the circuit board 125 may be exposed to the inside of the manhole 10 and thus may smoothly sense an inner state of the manhole 10.

However, an arrangement relationship between the wireless power reception antenna 140, the battery 130, and the circuit board 125 and an embedded state in the cover body 110 are not limited thereto and may be changed in various manners according to design conditions. However, when the wireless charging device 200 or 300 is disposed on the upper surface of the cover body 110, the wireless power reception antenna 140 may be disposed at the uppermost side of another component so that wireless charging may be smoothly performed.

As described above, the wireless charging device 200 or 300 may supply power for recharging the battery 130 by transmitting the wireless power to the wireless power reception antenna 140.

Figure 6:
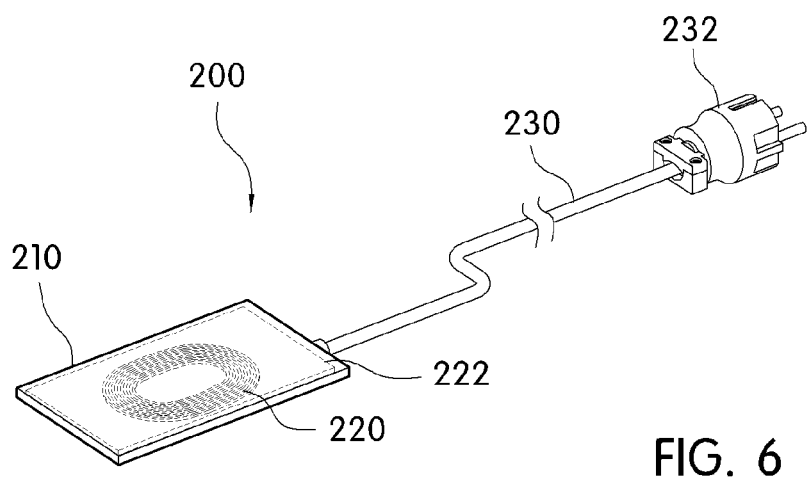
FIG. 6 is a view illustrating one shape of a wireless charging device applied to FIG. 5.

As shown in FIG. 6, the above-described wireless charging device 200 may be a known charging pad in which the wireless power transmission antenna 220, a shielding sheet 222, and a circuit part (not shown) are embedded in a housing 210, and the shielding sheet 222 may be disposed on one surface of the wireless power transmission antenna.

Further, the charging pad may include a cable 230 provided with a plug 232 for connection with a common power line at an end portion thereof. Accordingly, the charging pad may receive power for driving the wireless power transmission antenna 220 from the outside. Further, the wireless power transmission antenna 220 may be configured as one or more flat coil or may be an antenna pattern formed as a pattern in a loop shape in one surface of the circuit board.

However, the wireless charging device 200 is not limited thereto and may have a shape in which a separate battery is embedded in the housing and thus the cable 230 is omitted.

Figure 7:
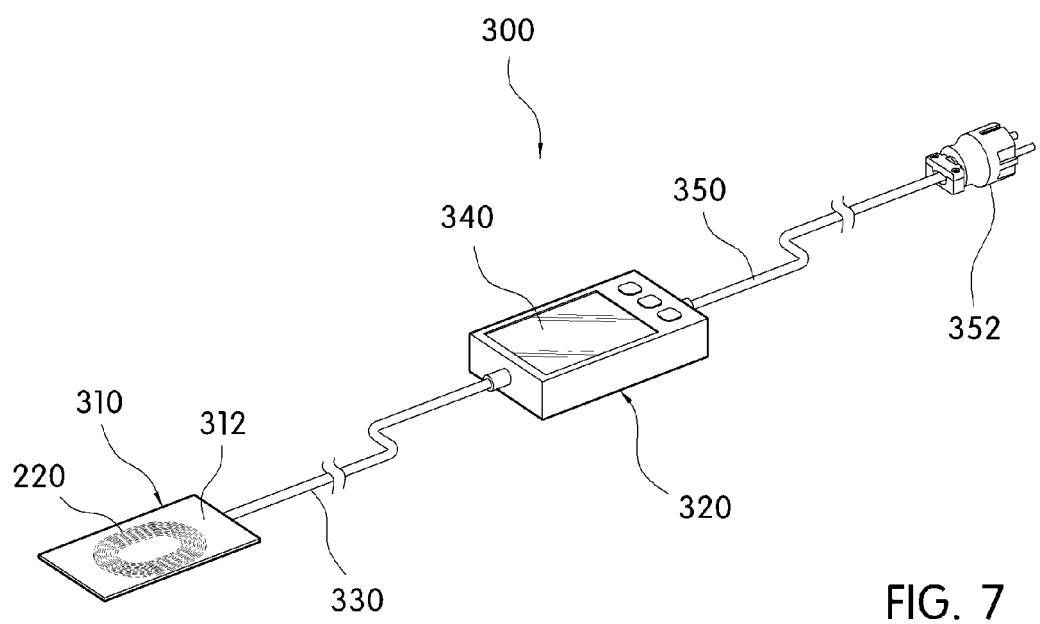
FIG. 7 is a view illustrating another wireless charging device applicable to FIG. 5.

As another example, as shown in FIG. 7, the wireless charging device 300 may include a pad-shaped pad part 310 laid on one surface of the cover body 110, and a main body part 320 connected with the pad part 310 through a cable 330.

That is, the pad part 310 may have a shape in which the above-described wireless power transmission antenna 220 and a shielding sheet (not shown) may be embedded in a housing 312, and a circuit part (not shown) which drives the wireless power transmission antenna 220 is embedded in the main body part 320.

In this case, the main body part 320 may include a display part 340, and an overall operation of the display part 340 may be controlled through the circuit part. Here, in the display part 340, a charge level of the battery 130 embedded in the manhole cover 100 may be displayed when the battery 130 is charged.

Accordingly, the worker may check the charge level of the battery 130 in real time through the display part 340. Further, since charging may be performed by disposing only the pad part 310 on the manhole cover 100 using the cable 330 even when the manhole cover 100 is disposed at a location in which accessibility or workability is inferior, such as a roadway, the battery 130 may be conveniently charged regardless of working environment.

In the embodiment, a built-in battery may be embedded in the main body part 320 to supply power for driving the main body part 320, and similar to the above-described embodiment, a cable 350 provided with a plug 352 for connection with a common power line at an end portion thereof may be included to receive common power from the outside through the cable 350.

Meanwhile, in the drawings and descriptions, the wireless power reception antenna 140 included in the manhole cover 100 and the wireless power transmission antenna 220 included in the wireless charging device 200 or 300 are shown and described in a loop shape such as a flat coil or flat antenna pattern but are not limited thereto.

As an example, each of the wireless power reception antenna 140 and the wireless power transmission antenna 220 may be provided in a solenoid shape on which a conductive member is wound along a longitudinal direction of a magnetic core having a predetermined length. Further, the wireless power transmission antenna 220 and the wireless power reception antenna 140 may be configured in the same shape or different shapes.

Although one embodiment of the present invention is described above, the spirit of the present invention is not limited to the embodiment shown in the description, and although those skilled in the art may provide other embodiments through the addition, change, or removal of the components within the scope of the same spirit of the present invention, such embodiments are also included in the scope of the spirit of the present invention.

The invention claimed is:

1. A manhole cover comprising:
   a cover body;
   an electronic circuit comprising at least one sensor configured to sense information inside a manhole and at least one communication circuit configured to transmit information which is obtained through the at least one sensor to outside, and embedded in the cover body;
   a battery providing driving power to the electronic circuit;
   a wireless power reception antenna embedded in the cover body to receive wireless power supplied from the outside and provide the wireless power to the battery;
   an accommodation part having a predetermined area formed through the cover body;
   a case formed of a nonconductive material and inserted into and disposed in the accommodation part; and
   an opening formed through the case,
   wherein the electronic circuit, the battery, and the wireless power reception antenna are disposed inside the case, and
   wherein the at least one sensor is exposed to the inside of the manhole through the opening.

2. The manhole cover of claim 1, wherein the electronic circuit includes one or more of a Global Positioning System (GPS) module, a near-field communication (NFC) circuit, a short-range wireless communication circuit, a temperature sensor, a humidity sensor, and a biometric sensor.

3. The manhole cover of claim 1, wherein the communication circuit provides information obtained through the at least one sensor to an external server or a portable terminal.

4. A manhole management system comprising:
   a manhole cover; and
   a portable wireless charger configured to transmit wireless power to a wireless power reception antenna of the manhole cover to provide power for charging a battery,
   wherein the manhole cover comprises:
   a cover body;
   an electronic circuit including at least one sensor configured to sense information inside a manhole and at least one communication circuit configured to transmit information obtained through the at least sensor to outside, and embedded in the cover body;
   the battery providing driving power to the electronic circuit;
   the wireless power reception antenna embedded in the cover body to receive wireless power supplied from the outside and provide the wireless power to the battery;
   an accommodation part having a predetermined area formed through the cover body;
   a case formed of a nonconductive material and inserted into and disposed in the accommodation part; and
   an opening formed through the case,
   wherein the electronic circuit, the battery, and the wireless power reception antenna are disposed inside the case, and
   wherein the at least one sensor is exposed to the inside of the manhole through the opening.

5. The manhole management system of claim 4, wherein the portable wireless charger is a wireless charging pad including a housing and a wireless power transmission antenna embedded in the housing.

6. The manhole management system of claim 5, wherein the portable wireless charger includes a plug for electrical connection with an external power line.

7. The manhole management system of claim 5, wherein:
   the portable wireless charger further includes a main body part connected to the housing through a cable; and
   the main body part includes a circuit part configured to drive the wireless power transmission antenna, and a display part configured to check a charge level of the battery embedded in the manhole cover.

8. The manhole management system of claim 4, wherein the electronic circuit includes one or more among a Global Positioning System (GPS), a near-field communication (NFC) circuit, a short-range wireless communication circuit, a temperature sensor, a humidity sensor, and a biometric sensor.

9. The manhole management system of claim 4, wherein the at least one communication circuit provides information obtained through the at least one sensor to an external server or a portable terminal.

* * * * *